United States Patent
Sanz

(10) Patent No.: US 10,400,822 B2
(45) Date of Patent: Sep. 3, 2019

(54) MULTI-MATERIAL CAGE

(71) Applicant: Aktiebolaget SKF, Göteborg (SE)

(72) Inventor: Alejandro Sanz, Nieuwegein (NL)

(73) Assignee: Aktiebolaget SKF, Göteborg (SE)

( * ) Notice: Subject to any disclaimer, the term of this patent is extended or adjusted under 35 U.S.C. 154(b) by 271 days.

(21) Appl. No.: 15/106,526

(22) PCT Filed: Dec. 18, 2014

(86) PCT No.: PCT/EP2014/078359
§ 371 (c)(1),
(2) Date: Jun. 20, 2016

(87) PCT Pub. No.: WO2015/091725
PCT Pub. Date: Jun. 25, 2015

(65) Prior Publication Data
US 2017/0023061 A1    Jan. 26, 2017

(30) Foreign Application Priority Data
Dec. 18, 2013   (GB) .................................. 1322419.1

(51) Int. Cl.
*F16C 33/38*    (2006.01)
*F16C 33/46*    (2006.01)
(Continued)

(52) U.S. Cl.
CPC ........ *F16C 33/3831* (2013.01); *B29C 64/112* (2017.08); *B33Y 10/00* (2014.12);
(Continued)

(58) Field of Classification Search
CPC .............. F16C 33/3831; F16C 33/3843; F16C 33/3887; F16C 33/414; F16C 33/44;
(Continued)

(56) References Cited

U.S. PATENT DOCUMENTS

| | | |
|---|---|---|
| 4,744,679 A | 5/1988 | Verburg et al. |
| 5,635,243 A | 6/1997 | Turchan et al. |

(Continued)

FOREIGN PATENT DOCUMENTS

| | | |
|---|---|---|
| CN | 2763621 Y | 3/2006 |
| CN | 201170262 Y | 12/2008 |

(Continued)

*Primary Examiner* — James Pilkington
(74) *Attorney, Agent, or Firm* — Bryan Peckjian; SKF USA Inc. Patent Dept.

(57) ABSTRACT

The invention provides a cage for a bearing. The invention further provides the bearing and a method of producing the cage. The cage includes a plurality of pockets at least partially surrounding the rolling elements. The cage further comprises a first material and a second material. The first material is a first printed material printed via an additive manufacturing process that has different properties compared to the second material. The first material is printed in the pockets at a position where, the rolling elements at least occasionally contact the pockets. Using such first printed material allows application of the first printed material at a location where it is needed.

6 Claims, 6 Drawing Sheets

(51) Int. Cl.
*F16C 33/44* (2006.01)
*F16C 33/56* (2006.01)
*B33Y 10/00* (2015.01)
*B33Y 80/00* (2015.01)
*B29C 64/112* (2017.01)
*F16C 33/41* (2006.01)
*F16C 33/51* (2006.01)

(52) U.S. Cl.
CPC .......... *B33Y 80/00* (2014.12); *F16C 33/3843* (2013.01); *F16C 33/3887* (2013.01); *F16C 33/44* (2013.01); *F16C 33/467* (2013.01); *F16C 33/4611* (2013.01); *F16C 33/4623* (2013.01); *F16C 33/56* (2013.01); *B29K 2995/0093* (2013.01); *F16C 33/414* (2013.01); *F16C 33/513* (2013.01); *F16C 2220/24* (2013.01); *F16C 2300/02* (2013.01)

(58) Field of Classification Search
CPC .............. F16C 33/4611; F16C 33/4626; F16C 33/467; F16C 33/513; F16C 33/56; F16C 43/065
See application file for complete search history.

(56) References Cited

U.S. PATENT DOCUMENTS

| | | |
|---|---|---|
| 2009/0304321 A1 | 12/2009 | Horton et al. |
| 2013/0163908 A1* | 6/2013 | Haag .................... F16C 33/445 384/470 |
| 2013/0216174 A1 | 8/2013 | Braun |

FOREIGN PATENT DOCUMENTS

| | | | |
|---|---|---|---|
| CN | 103174756 A | | 6/2013 |
| DE | 102010034962 | * | 2/2012 |
| JP | 2008038978 A | | 2/2008 |
| WO | 9811356 A1 | | 3/1998 |

* cited by examiner

MULTI-MATERIAL CAGE

CROSS-REFERENCE TO RELATED APPLICATIONS

This application is the U.S. national stage of International Application No. PCT/EP2014/078359 filed on Dec. 18, 2014, which claims priority to Great Britain patent application no. 1322419.1 filed on Dec. 18, 2013, the contents of which are both fully incorporated herein by reference.

FIELD OF THE INVENTION

The invention relates to a cage for securing a position of rolling elements in a bearing. The invention further relates to a bearing and to a method of producing the cage.

BACKGROUND ART

Additive manufacturing or more commonly called 3D printing is a known production technique in which a three-dimensional solid object is generated from a digital model. The process of additive manufacturing starts with generating the digital model via any known digital modeling methods, such as using a CAD program. Next, the digital model is divided into slices in which each slice indicates for this layer of the digital model where the printed material should be located. The individual slices are sequentially fed into an additive manufacturing tool or 3D printer which deposits the material according to the individual slices and as such generates the complete three-dimensional solid object layer by layer.

In the early days of additive manufacturing, mainly plastic materials or resins have been used as printed material for generating the three-dimensional solid object, but other processes have been developed in which also other materials, including different types of metal may be deposited in layers using this additive manufacturing technique. A major benefit of this manufacturing technique is that it allows the designer to produce virtually any three-dimensional object in a relatively simple production method. This may be especially beneficial when, for example, an initial model is required of a product or when only a limited number of products are required. A drawback of this manufacturing technique is the speed at which the three-dimensional solid objection is produced.

The use of additive manufacturing in high-quality bearings has been limited. This is caused by material requirements for such high-quality bearings which seem insufficient for the current materials applied via the additive manufacturing process.

SUMMARY OF THE INVENTION

One of the objects of the invention is to provide a cage for a bearing in which the cage comprises printed material printed via additive manufacturing.

The cage in accordance with the first aspect of the invention comprises a plurality of pockets, in use, at least partially surrounding the rolling elements, wherein the cage comprises a first material and a second material, the first material being a first printed material being printed via an additive manufacturing process and having different properties compared to the second material, wherein the first material is printed in the pockets where, in use, the rolling elements at least occasionally contact the pockets.

The inventors have realized that material properties for cages near the rolling elements may be different compared to material properties at the remainder of the cage. However, it is often relatively costly or even nearly impossible to apply such different materials locally only. Known methods to apply such specific material locally often require, for example, masking a part of the cage and, for example, coating only the unmasked parts with the specific material. However, such production methods are relatively labor intense and expensive and often rather inaccurate. Furthermore, the coating processes often requires a specific temperature or a deposition chamber which further imposes significant limitations on the suitability of such coating solutions for functionalizing different parts of the cage. Using a cage according to the invention in which the first material is first printed material which is applied via the additive manufacturing process, the first material may relatively easily be applied locally by the printing process. This reduces the labor intensive masking steps and allows to deposit the first material only at the locations where they are actually wanted and/or required.

The first material is different from the second material. This difference between the first material and the second material may be because of the chemical difference between the first material and the second material. Alternatively, the first material may only be different from the second material by the structure in which it is applied, for example, whether it is a crystal, amorphous or other structure.

In an embodiment of the cage, the second material is a second printed material different from the first printed material. In this embodiment, a major part of the cage may constitute of printed material, being either the first printed material or the second printed material. Of course even further different types of printed materials may be used for generating the cage. An advantage of a cage which is generated from printed material is that it provides a high degree of freedom in the cage geometry and the possibility of placing the needed materials only where they are needed and not across the bulk of the cage. The additional freedom comes from the fact that the geometrical distribution of the elements that make up a cage are not limited as would be when using the traditional construction processes for the cage, e.g. injection molding and casting which impose limitations related to the flow of non-molten materials into the cast as well as the passage of such materials through narrow section of the cage. Furthermore, specialized materials may be required in the pockets of the cage, for example, for reducing wear. Such specialized materials are often relatively expensive. Using the additive manufacturing process to apply the printed material only at the location where needed generates a significant cost reduction.

The surface in the pockets of the cage can be built as part of the process to build the whole cage. This further enables to optimize or tune surface roughness, wetting, heat exchange and other performance parameters without having additional processes to control these performance parameters. All may be done in a single additive manufacturing production step.

In an embodiment of the cage, the first material is only present at a contact surface of the cage, the contact surface being a part of the surface of the cage where, in use, at least occasionally a frictional force is applied to the cage. The contacts between the moving rolling elements (sphere or rollers) against the cage create a contact force oppose to the movement of the rollers and therefore increasing the internal friction of the bearing unit. This could also lead to phenomena like wear and energy inefficiency in the system. The potential contact areas can be modeled and in general designers try to bring geometrical features to physically retain the lubricant (if it is grease) or by increasing the clearance in the cage, which also generates both noise and unwanted rolling element movements inside the cage. By applying the first material only at the contact surface of the cage one or more of the above problems may be solved. The surface wettability may be controlled by applying a specific first material at the contact surface of the cage, allowing getting the lubricant in the desired quantities only where needed. An important advantage of having the contact surface, for example, having a tuned wetting behavior is that it results in a significant reduction of the amount of lubricant inside the rolling bearing. This has reduces the friction, for example, associated with churning the grease as the bearing turns. Furthermore, less lubricants are used which reduces any impact such lubricants may have on the environment.

In an embodiment of the cage, the cage comprise a functionally graded interface layer at one of the interfaces between the first material and the second material, a composition of the functionally graded interface layer is configured to gradually change from the first material via a mixture of the first material and the second material to the second material. An important benefit of using functionally graded interface layers is that the bonding characteristics of the two materials is significantly improved without the need for additional bonding materials, structures or layers which may degrade the specific material characteristics required for either the first material or the second material. Coatings typically create an abrupt interphase between the bulk (base) material and the deposited layer. This interface is a weak point as it acts as stress concentrator and defines a sharp transition in terms of properties, e.g. thermal expansion, stiffness, elastic properties, chemical gradients, etc. Using an intermediate layer with intermediate properties reduces the abruptness of the properties changes but doubles the number of interfaces. A graded solution is very difficult to make in coating processes as the deposition of the two materials needs to be compatible with the coating process. However, using the additive manufacturing process in which material is deposited in a layer by layer almost pixelated fashion, mixing of different materials and even gradual changing the mixing ratio layer by layer is relatively simple. There is no defined interface and it combines the best properties from the bulk and the best surface performances in a seamless solution.

In an embodiment of the cage, the first material comprises a material selected from a list comprising: a low-friction material, an oleophilic material, and a self-lubricating material. Such low-friction materials may enable noise reduction of the bearing comprising the cages according to the invention. Self-lubricant materials may be rather difficult to apply locally and may be rather difficult to apply in a relatively homogeneous layer. Furthermore, the process of locally applying the self-lubricant materials is also relatively expensive to achieve local wetting behavior, either philic or phobic. The wetting may also be obtained by changing a roughness parameter and a texture (orientation) of the surface. Using this additive manufacturing technique, the self-lubricating material may be applied exactly locally there where it is needed and at a layer thickness as required. This results in a good local concentration of the self-lubricant material in a cost-effective manner.

In an embodiment of the cage, the low-friction material is selected from a list comprising graphite, nano-tubes, fullerenes, C60 and other carbon structures, shearable particles, resins, specific polymers/elastomers. In an embodiment of the cage, the oleophilic material is selected from a list comprising polystyrene, silicone, Kapok. In a further embodiment of the cage, the self-lubricating material is selected from a list comprising graphite, nano-tubes.

In an embodiment of the cage, the second material comprises a hydrophobic material. This second material may be located away from the rolling elements and may ban moisture away from the rolling elements to reduce corrosion of the rolling elements.

In an embodiment of the cage, the second material comprises a hollow structure. A hollow structure may be used to reduce the weight of the cage. Furthermore, the hollow structure may create space without the need for additional volume. As such, this created hollow structure, for example, created during the printing of the cage in the additive manufacturing process, may now be used for other functionalities, such as the containing of lubricants or sensors or even built-in batteries.

In an embodiment of the cage, the hollow structure comprises an opening towards the rolling element. When, for example, the hollow structure is filled with lubricant, the lubricant may be delivered to the rolling elements from the hollow structure in use. The hollow structure may also comprise a sensor and the opening towards the rolling element may generate a connection to the lubricants near the rolling element and provide an indication of the quality of the lubricant near the rolling element. This may be used to monitor the condition of the bearing and only start maintenance work when really necessary. Such hollow structure may also comprise an emergency release of the lubricant (solving the soap or one of the soaps in a grease)—for example, via an emergency trigger controlled via a controller which may be activated to release the access of lubricant in an emergency. In the case of greases, approximately 80% of the lubricant always remains trapped within the grease. There may be a chemical or an electrical activation of the dissolution of the soap activated by, for example, a thermal trigger—for example, when the bearing is getting too hot—or by a sensor activated trigger. The release mechanism could be chemical, pyrotechnical or even just electric.

In an embodiment of the cage, the hollow structure, in use, comprises a lubricant. In an embodiment of the cage, the cage is constituted of printed material comprising the first printed material and the second printed material, and wherein the cage is produced by printing the printed material around the rolling elements. Cages are often produce in two parts which are joined together to fix the position of the roller elements inside the cage. At the position where the two parts are joined, the cage may have a weaker construction or the wear at the roller elements may be increased locally. When producing the cage according to the current embodiment, the cage is printed around the roller elements which prevents any weakness in the construction and prevents increased local wear. Furthermore, clearance between the rolling elements and the cage are often derived from the mounting compromise which is required when the cage is built separately. When printing the cage around the rolling elements, the clearance between the rolling elements may be optimized without the need for mounting concessions.

The bearing in accordance with the second aspect of the invention comprises the ring according to the invention.

The method in accordance with the third aspect of the invention comprises a step of: printing the first material onto the second material via the additive manufacturing process. This printing process enables that the first material may be deposited at a location in the pockets of the cage where they are required. Furthermore, the use of the additive manufacturing process allows accurate dosage of the first material, which may result in a reduction of cost. Furthermore, the accurate dosage of the first material may add additional local functionality.

In an embodiment of the method, the method further comprises the step of: printing the second material via the additive manufacturing process.

In an embodiment of the method, the step of printing the first material and/or the second material comprises printing the printed material around the rolling elements.

In an embodiment of the method, the additive manufacturing process is selected from a list comprising stereolithography, selective laser sintering, laminated object manufacturing, fused deposition modeling, selective binding, laser engineering net shaping, photo polymerization and selective electron beam sintering, 3D nesting.

BRIEF DESCRIPTION OF THE DRAWINGS

These and other aspects of the invention are apparent from and will be elucidated with reference to the embodiments described hereinafter. In the drawings.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1A:
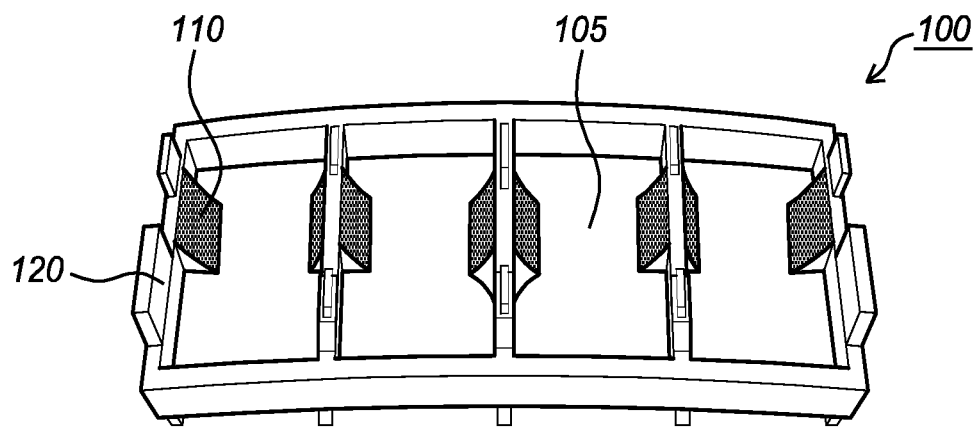
FIG. 1A shows a plan view of a first embodiment of a cage for a bearing according to the invention.

FIG. 1A shows a plan view of a first embodiment of a cage 100 for a bearing 300 (see FIG. 3) according to the invention. Such cages are used in bearings 300 to secure the position of the rolling elements 305 (see FIG. 3) inside the bearing 300 in operation. The positioning of the rolling elements 305 inside the bearing 300 is important to ensure that the load distribution within the bearing is optimal—usually evenly—distributed. The cage 100 as shown in FIG. 1A comprises pockets 105 for the rolling elements 305. These pockets 105 at least partially surround the rolling elements 305 in operation. The cage according to the invention comprises a first material 110 being first printed material 110 which is deposited or printed in the pockets 105 of the cage 100 at a location where, in use the rolling elements 305 at least occasionally contact the cage 100. Of course, the first printed material 110 may also be deposited at more positions inside the pocket 105 without departing from the scope of the invention.

The first printed material 110 may, for example, be self-lubricant material or an oleophilic material for ensuring that the lubrication of the rolling elements 305 is provided for. This first printed material 110 may be applied only at the contact surface (not indicated) between the rolling element 305 and the cage 100.

The second material 120 may be prefabricated via any other production process, for example, injection molding process or casting process. The first printed material 110 may be printed on top of the second material 120. Alternatively, the second material 120 may also be printed via the additive manufacturing process. When also printing the second material 120, the deposition of the first material 110 on the second material 120 may generate a functionally graded interface. The composition of such functionally graded interface layer is configured to gradually change from the first material 110 via a mixture of the first material 110 and the second material 120 to the second material 120. A benefit of such functionally graded interface layer is that the bonding between the first printed material 110 and the second material 120 is relatively strong.

The second material 120 may, for example, be different from the first material 110. For example, the first material 110 may be oleophilic material having a predefined wetting behavior for ensuring that sufficient lubricant is present at the interface between the cage 100 and the rolling element 305. The second material 120 may, for example, be hydrophobic to ensure that water and moisture is banned from the cage 100 to reduce corrosion of the rolling elements 305 inside the bearing 300.

Figure 2A:
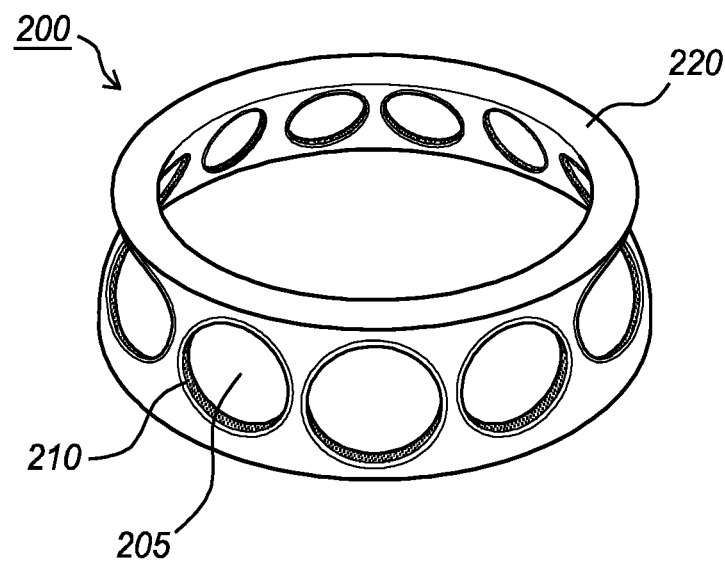
FIG. 2A shows a plan view of a third embodiment of a cage for a bearing according to the invention.
Figure 2B:
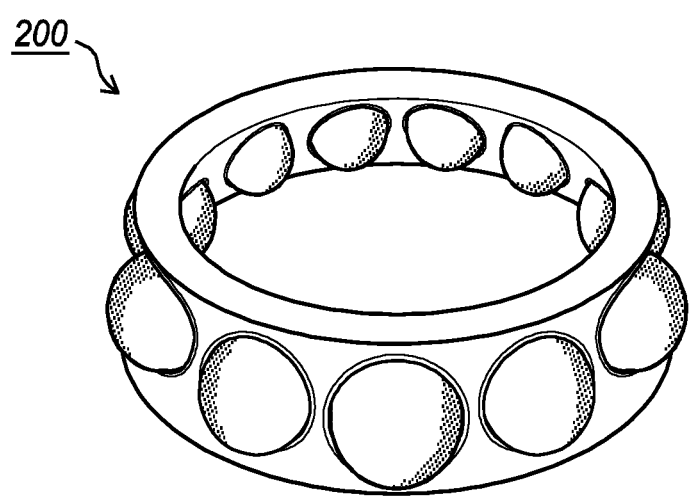
FIG. 2B shows a plan view of the third embodiment of the cage comprising rolling elements.
Figure 2C:
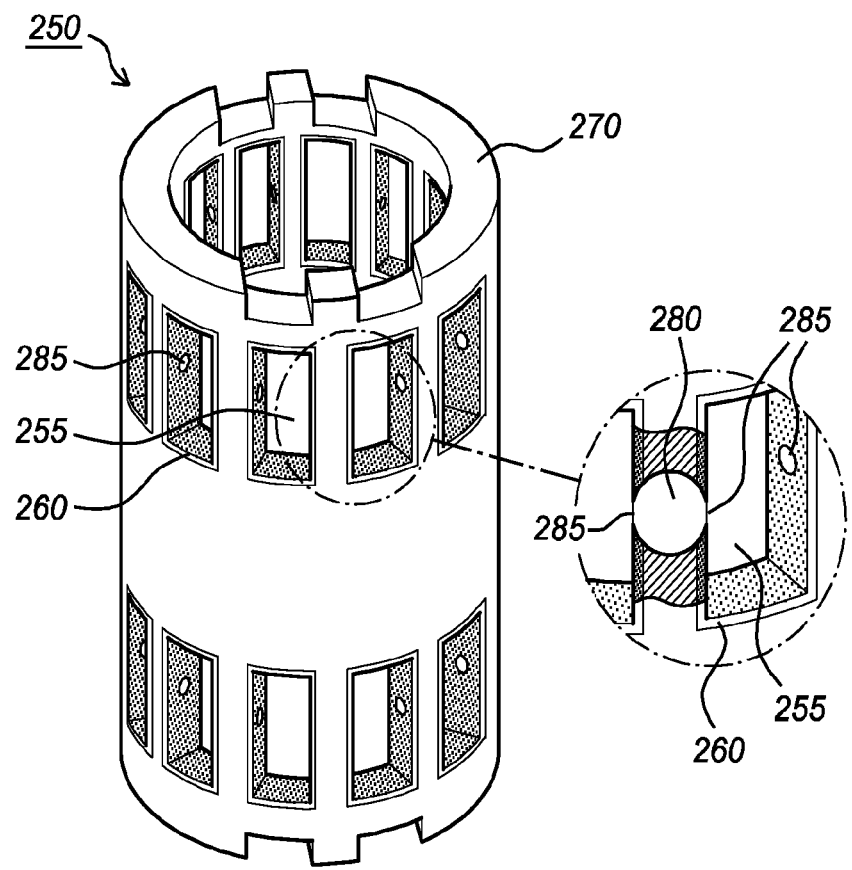
FIG. 2C shows a plan view of a fourth embodiment of the cage according to the invention.

In an embodiment in which the second material 120 also at least partially is printed material, the second material 120 may comprise a hollow structure 280 (shown in FIG. 2C). Such a hollow structure 280 may generate additional space inside the bearing 300 without the need for more volume. Such hollow structure 280 may be used to contain lubricant which may be deposited to the interface between the cage 100 and the rolling elements 305 via an opening 285 (again shown in FIG. 2C). Alternatively, the hollow structure 280 may comprise other elements, such as sensors (not shown) or batteries (not shown) to feed such sensors. The inclusion of sensors in the hollow structure 280 allows measurements inside the cage 100 or bearing 300 to monitor parameters, for example, for determining maintenance needs of the bearing 300.

Figure 1B:
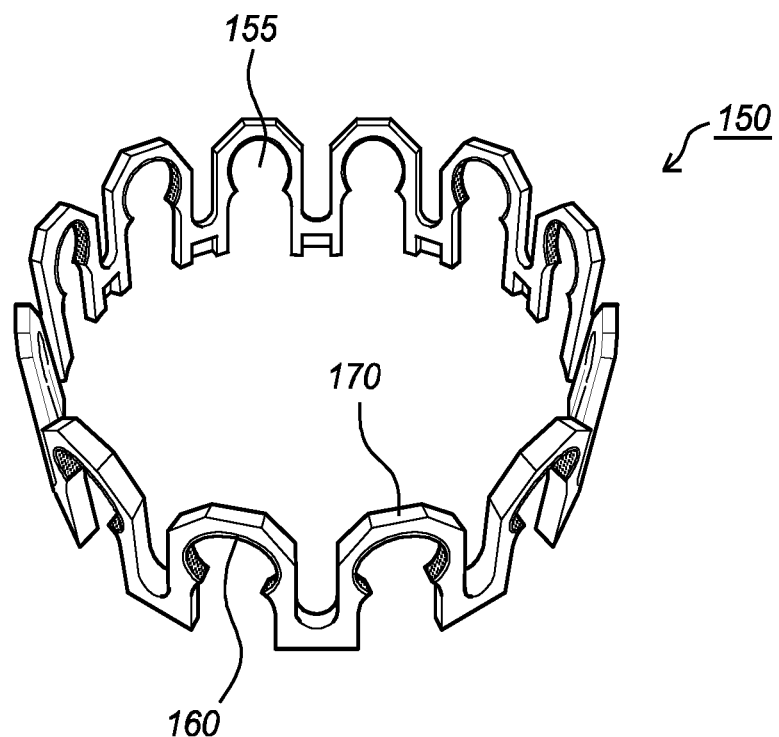
FIG. 1B shows a plan view of a second embodiment of the cage for the bearing according to the invention.

FIG. 1B shows a plan view of a second embodiment of the cage 150 for the bearing 300 according to the invention. Also this cage 150 comprises pockets 155 in which the first material 160 is printed on the second material 170. Also this second material 170 may have been prefabricated, or may be generated, for example, partially, of second printed material 170. The characteristics of the first material 160 and the second material 170 as indicated herein above, may also be used in the embodiment shown in FIG. 1B. Both the cages 100, 150 shown in FIGS. 1A and 1B typically are used for cylindrically shaped rolling elements (not shown) or even tapered rolling elements (not shown).

FIG. 2A shows a plan view of a third embodiment of the cage 200 for the bearing 300 according to the invention. The cage 200 as shown in FIG. 2A is used for spherical rolling elements 305, and in FIG. 2B a plan view of this third embodiment of the cage 200 is shown in which the spherical elements 305 are included in pockets 205 in the cage 200. The pockets 205 have side walls that are lined with the printed first material 210. Such a cage 200 may, beneficially be printed around the rolling elements 305. A benefit of such production of the cage 200 is that no concessions are necessary in the cage design related to known production techniques, such as injection molding or casting. Using the additive manufacturing process allows substantially all freedom to design any shape of the cage 200.

FIG. 2C shows a plan view of a fourth embodiment of the cage 250 according to the invention. The cage 250 shown in FIG. 2C actually is a double cage 250 in which two sets of rolling elements 305 may be used in a single bearing 300. Two sets of rolling elements 305 each positioned in their radially positioned pockets 255, in which the first set of rolling elements 305 is displaced along a rotation axis (not indicated) compared to the second set of rolling elements 305. The cage 250 may, for example, at least partially be constituted of the second material 270 in which, in the pockets 255 the first material 260 is printed. The cage 250 may have been generated by printing the second material 270 into the three-dimensional structure forming the cage 250 or, for example, on a frame (not shown) inside the cage 250. Such a frame may be used to increase strength of the cage 250. Printing the second material 270 also allows including at some locations inside the second material 270 one or more hollow structures as indicated in the lower part of FIG. 2C via an enlarged view of a section of second material 270. Such a hollow structure 280 may, in use contain a lubricant which may be released toward the rolling elements 305 via an opening 285. As indicated before, the hollow structure 280 may also comprise other elements such as a sensor (not shown) and/or a battery (not shown) or other energy storage facility—enabling to measure parameters useful to determine, for example, when the next maintenance would be due. Of course other parameters providing other intelligence about the system or condition of the bearing 300 or its building blocks may also be measured by the sensor.

Figure 3:
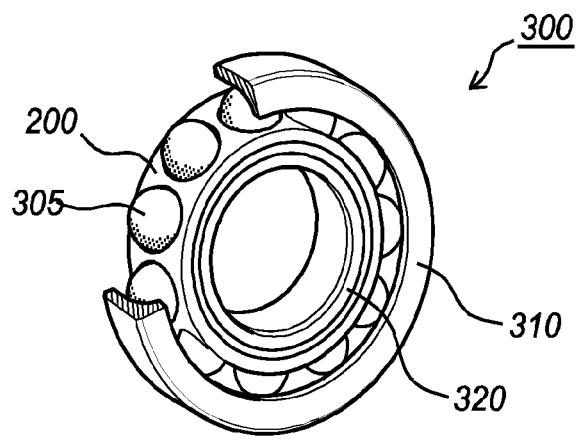
FIG. 3 shows a plan view of a bearing according to the invention, partially cut open.

FIG. 3 shows a plan view of a bearing 300 according to the invention, partially cut open. The bearing 300 shown in FIG. 2 is a ball-bearing 300 comprising rolling elements 305 being spheres 305. The bearing 300 comprises an inner ring 320 an outer ring 310 and a cage 200 according to the embodiments of the invention.

Figure 4A:
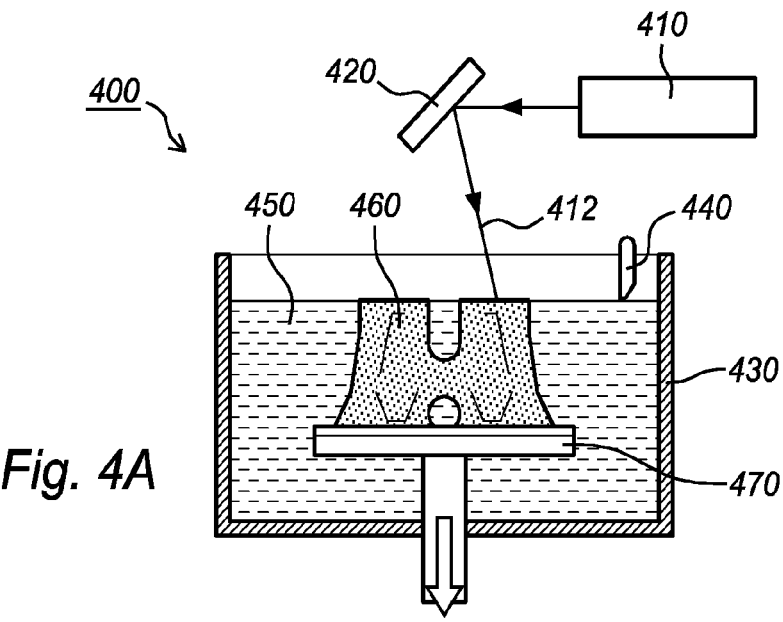
FIG. 4A shows a first embodiment of an additive manufacturing tool in which a liquid resin is used for applying the printed material in the additive manufacturing process.

FIG. 4A shows a first embodiment of an additive manufacturing tool 400 in which a liquid resin 450 is used for applying the printed material 460 in the additive manufacturing process. Such additive manufacturing tool 400 comprises resin container 430 comprising the liquid resin 450. Inside the resin container 430 a platform 470 is positioned which is configured to slowly move down into the resin container 430. The additive manufacturing tool 400 further comprises a laser 410 which emits a laser beam 412 having a wavelength for curing the liquid resin 450 at the locations on the printed material 460 where additional printed material 460 should be added. A re-coating bar 440 is drawn over the printed material 460 before a new layer of printed material 460 is to be applied to ensure that a thin layer of liquid resin 450 is on top of the printed material 460. Emitting using the laser 410 those parts of the thin layer of liquid resin 450 where the additional printed material 460 should be applied will locally cure the resin 450. In the embodiment as shown in FIG. 4A the laser beam 412 is reflected across the layer of liquid resin 450 using a scanning mirror 420. When in the current layer all parts that need to be cured, have been illuminated with the laser beam 412, the platform 470 lowers the printed material 460 further into the liquid resin 450 to allow the re-coating bar 460 to apply another layer of liquid resin 450 on top of the printed material 460 to continue the additive manufacturing process.

Figure 4B:
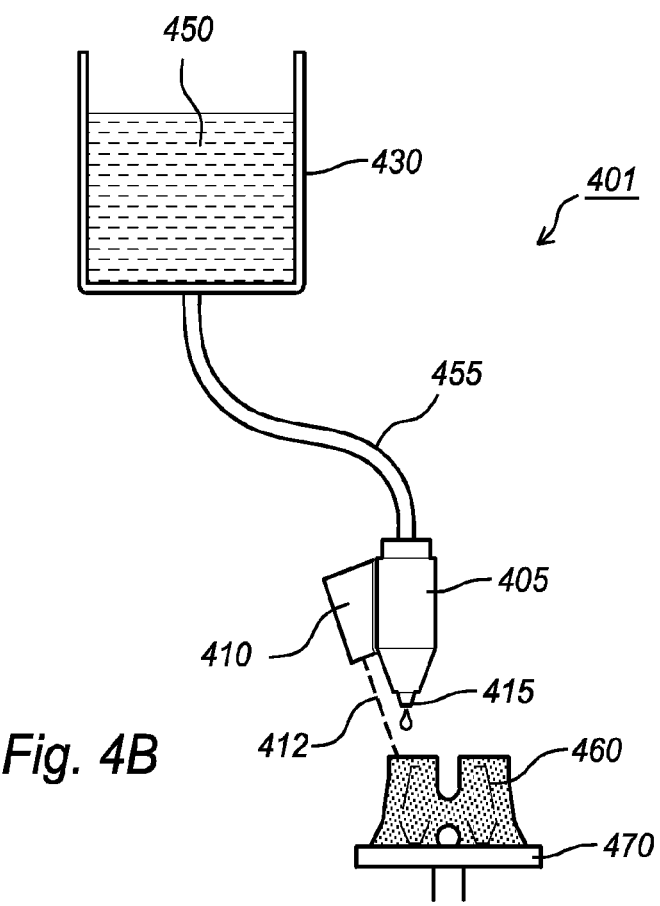
FIG. 4B shows a second embodiment of the additive manufacturing tool in which a liquid resin is dispensed from a dispenser for applying the printed material in the additive manufacturing process.

FIG. 4B shows a second embodiment of the additive manufacturing tool 401 in which a liquid resin 450 is dispensed from a dispenser 405 or print head 405 for applying the printed material 460 in the additive manufacturing process. The additive manufacturing tool 401 again comprises the resin container 430 comprising the liquid resin 450 which is fed via a feed 455 towards the print head 405. The print head 405 further comprises a print nozzle 415 from which droplets of liquid resin 450 are emitted towards the printed material 460. These droplets may fall under gravity from the print head 405 to the printed material 460 or may be ejected from the print nozzle 415 using some ejection mechanism (not shown) towards the printed material 460. The print head 405 further comprises a laser 410 emitting a laser beam 412 for immediately cure the droplet of liquid resin 450 when it hits the printed material 460 to fix the droplet of liquid resin 450 to the already printed material 460. The printed material 460 forming a solid object may be located on a platform 470.

Figure 5A:
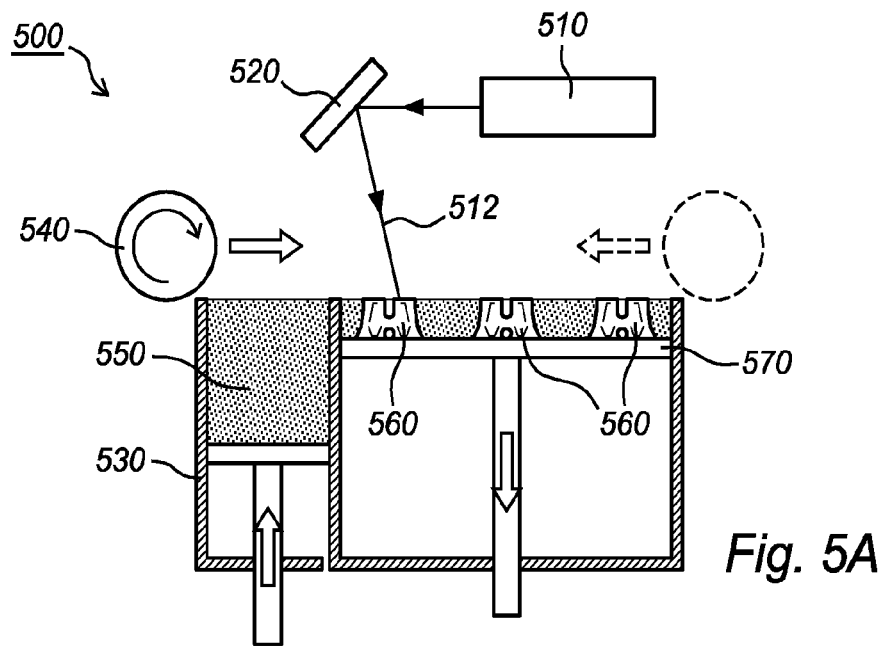
FIG. 5A shows a third embodiment of the additive manufacturing tool in which the material is granulated into small solid particles which are used for applying the printed material in the additive manufacturing process.

FIG. 5A shows a third embodiment of the additive manufacturing tool 500 in which the material is granulated into small solid particles 550 which are used for applying the printed material 560 in the additive manufacturing process. Now, the additive manufacturing tool 500, also known as a Selective Laser Sintering tool 500, or SLS tool 500 comprises a granulate container 530 comprising the granulated small solid particles 550. The printed material 560 is located again on a platform 570 and is completely surrounded by the granulated small solid particles 550. Lowering the platform allows a granulate feed roller 540 to apply another layer of granulated solid particles 550 on the printed material 560. Subsequently locally applying the laser beam 512 using the laser 510 and the scanning mirror 520 will locally melt the granulated solid particles 550 and connects them with each other and with the printed material 560 to generate the next layer of the solid object to be created. Next, the platform 570 moves down further to allow a next layer of granulated solid particles 550 to be applied via the granulate feed roller 540 to continue the next layer in the additive manufacturing process.

Figure 5B:
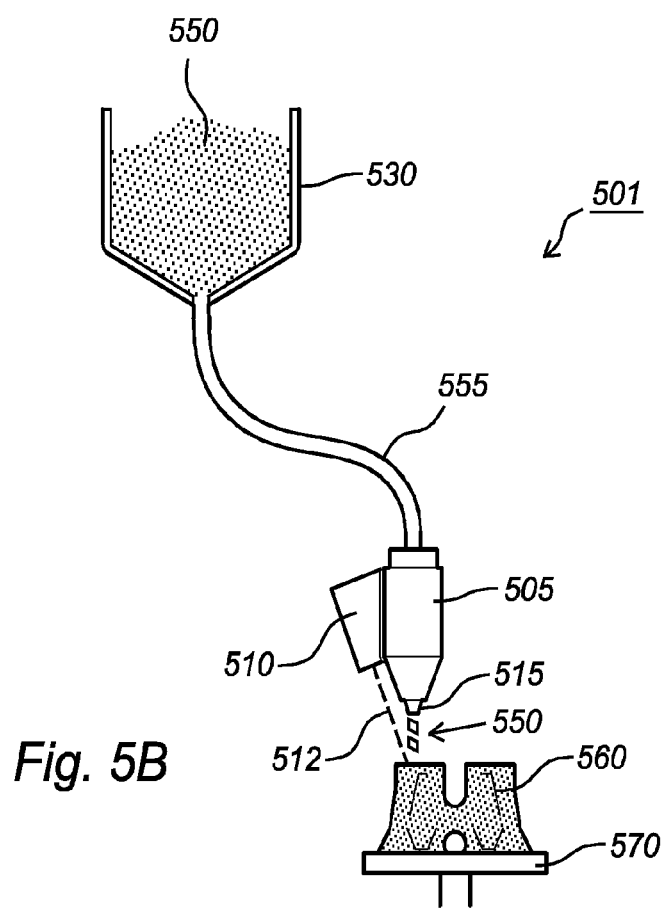
FIG. 5B shows a fourth embodiment of the additive manufacturing tool in which the granulated solid material is dispensed from a dispenser for applying the printed material in the additive manufacturing process.

FIG. 5B shows a fourth embodiment of the additive manufacturing tool 501 or SLS tool 501 in which the granulated solid material 550 is dispensed from a dispenser 505 or print head 505 for applying the printed material 560 in the additive manufacturing process. The additive manufacturing tool 501 again comprises the granulate container 530 comprising the granulated solid particles 550 which are fed via a feed 555 towards the print head 505. The print head 505 further comprises a print nozzle 515 from which granulated solid particles 550 are emitted towards the printed material 560. These solid particles 550 may fall under gravity from the print head 505 to the printed material 560 or may be ejected from the print nozzle 515 using some ejection mechanism (not shown) towards the printed material 560. The print head 505 further comprises a laser 510 emitting a laser beam 512 for immediately melting or sintering the solid particle 550 when it hits the printed material 560 to fix the solid particle 550 to the already printed material 560. The printed material 560 forming a solid object may be located on a platform 570.

Figure 6:
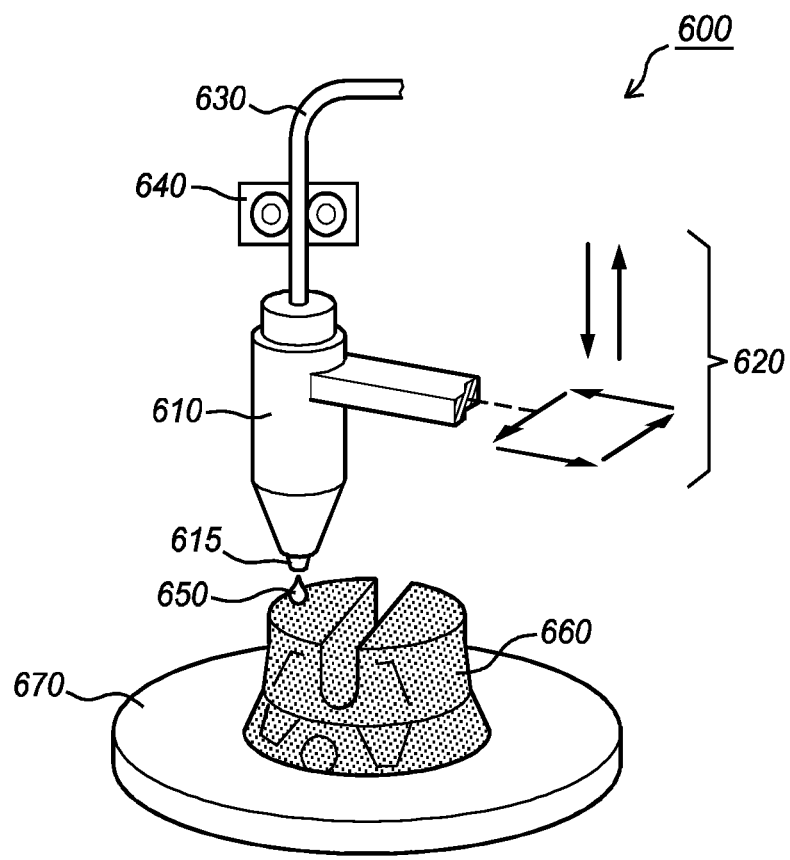
FIG. 6 shows a fifth embodiment of the additive manufacturing tool in which a melted plastic material is dispensed for applying the printed material in the additive manufacturing process.

FIG. 6 shows a fifth embodiment of the additive manufacturing tool 600 in which a melted plastic material 650 is dispensed for applying the printed material 660 in the additive manufacturing process. The additive manufacturing tool 600 shown in FIG. 6 is also known as Fused Deposition Modeling tool 600 or FDM tool 600. Now a plastic filament 630 is fed into a dispenser 610 or melter 610 via a filament feeder 640. The dispenser 610 or melter 610 comprises an extrusion nozzle 615 for melting the plastic filament 630 to form a droplet of melted plastic material 650 which is applied to the printed material 660 where it hardens and connects to the already printed material 660. The dispenser 610 may be configured and constructed to apply the droplet of melted plastic 650 to the printed material 660 under gravity or via an ejection mechanism (not shown). The additive manufacturing tool 600 further comprises a positioning system 620 for positioning the dispenser 610 across the printed material 660.

Summarizing, the invention provides a cage 100 for a bearing. The invention further provides the bearing and a method of producing the cage. The cage comprises a plurality of pockets 105, in use, at least partially surrounding the rolling elements. The cage further comprises a first material 110 and a second material 120, wherein the first material is a first printed material 110 printed via an additive manufacturing process which has different properties compared to the second material. The first material is printed in the pockets at a position where, in use, the rolling elements at least occasionally contact the pockets. Using such first printed material allows to apply the first printed material at a location where it is actually needed.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

| Listing of Reference numbers | | | |
|---|---|---|---|
| Cage | 100, 150, 200, 250 | Laser | 410, 510 |
| | | Laser beam | 412, 512 |
| Pocket | 105, 155, 205, 255 | Scanning mirror | 420, 520 |
| | | Resin container | 430 |
| First material | 110, 160, 210, 260 | Re-coating bar | 440 |
| | | Liquid resin | 450 |
| Second material | 120, 170, 220, 270 | Feed | 455, 555 |
| | | Platform | 470, 570, 670 |
| Hollow structure | 280 | SLS-tool | 500, 501 |
| Opening | 285 | Granulate container | 530 |
| Rolling elements | 305 | Granulate feed roller | 540 |

| Listing of Reference numbers (continued) | | | |
|---|---|---|---|
| Bearing | 300 | Granulate material | 550 |
| Outer ring | 310 | FDM-tool | 600 |
| Inner ring | 320 | Melter | 610 |
| Printed material | 110, 160, 210, 260, 120, 170, 220, 270, 460, 560, 660 | Extrusion nozzle | 615 |
| | | Positioning construction | 620 |
| | | Filament | 630 |
| | | Filament feeder | 640 |
| Additive manufacturing tool | 400, 401 | Liquid plastic | 650 |
| Print head | 405, 505 | | |
| Print nozzle | 415, 515 | | |

The invention claimed is:

1. A cage for securing a position of rolling elements in a bearing, the cage comprising:
   a plurality of pockets at least partially surrounding the rolling elements, wherein
   the cage includes a first material and a second material, the first material being a first printed material being printed via an additive manufacturing process and having different properties than the second material, wherein
   the first material is printed in the pockets wherein
   the rolling elements at least occasionally contact the pockets, and wherein
   the cage further comprises a functionally graded interface layer at one of the interfaces between the first material and the second material, a composition of the functionally graded interface layer is configured to gradually change from the first material via a mixture of the first material and the second material to the second material.

2. A method of producing a bearing cage, the bearing cage having;
   a plurality of pockets configured to at least partially surround a plurality of rolling elements, wherein
   the bearing cage includes a first material and a second material, the first material being a first printed material being printed via an additive manufacturing process and having different properties than the second material, wherein
   the first material is printed in the pockets, and wherein
   the rolling elements at least occasionally contact the pockets, the method comprising:
   printing the first material onto the second material via the additive manufacturing process, and
   printing the second material via the additive manufacturing process,
   wherein the step of printing at least one of the first material and the second material comprises printing the printed material around the rolling elements.

3. A method of producing a bearing cage having a plurality of pockets, each pocket being configured to receive a bearing rolling element, the method comprising:
   forming a bearing cage body having a plurality of pockets from a first material, each of the pockets having a plurality of side walls; and
   printing a second material on at least some of the plurality of side walls by an additive manufacturing process, the second material having different properties than the first material.

4. The method according to claim 3, wherein forming the bearing cage body comprises forming the bearing cage body by injection molding or by casting.

5. The method according to claim 3, wherein forming the bearing cage body comprises forming the bearing cage body by the additive manufacturing process.

6. The method according to claim 3, wherein printing the second material comprises printing the second material only on the plurality of side walls.

* * * * *